US012261495B2

(12) United States Patent
Cunningham et al.

(10) Patent No.: US 12,261,495 B2
(45) Date of Patent: Mar. 25, 2025

(54) ELECTRICAL MACHINE, IN PARTICULAR FOR A VEHICLE

(71) Applicant: Mahle International GmbH, Stuttgart (DE)

(72) Inventors: John Cunningham, Muxton Telford (GB); Philip Grabherr, Stuttgart (DE); Ian Webb, Telford (GB); Tim Male, Telford (GB); Stojan Markic, Kojsko (SI); Graham Sentance, Stanford Bridge (GB); Peter Sever, Murska Sobota (SI); Josef Sonntag, Nuertingen (DE); Jon Witcombe, Telford (GB)

(73) Assignee: Mahle International GmbH, Stuttgart (DE)

( * ) Notice: Subject to any disclaimer, the term of this patent is extended or adjusted under 35 U.S.C. 154(b) by 249 days.

(21) Appl. No.: 16/892,227

(22) Filed: Jun. 3, 2020

(65) Prior Publication Data

US 2020/0295614 A1    Sep. 17, 2020

Related U.S. Application Data

(63) Continuation of application No. PCT/EP2018/081564, filed on Nov. 16, 2018.

(30) Foreign Application Priority Data

Dec. 4, 2017    (DE) ............... 10 2017 221 835.5

(51) Int. Cl.
*H02K 3/24*   (2006.01)
*H02K 9/22*   (2006.01)
(Continued)

(52) U.S. Cl.
CPC ............... *H02K 3/24* (2013.01); *H02K 9/227* (2021.01); *B60K 1/00* (2013.01); *H02K 9/197* (2013.01)

(58) Field of Classification Search
CPC ........... H02K 9/227; H02K 3/32; H02K 5/08; H02K 9/197; H02K 1/20; H02K 3/345;
(Continued)

(56) References Cited

U.S. PATENT DOCUMENTS 2,390,130 A     12/1945   Sigmund et al.
2,702,870 A *    2/1955   Norris ...................... H02K 3/24
                                                              310/262

(Continued)

FOREIGN PATENT DOCUMENTS

CH        413077 A      5/1966
CN       1220037 A      6/1999
(Continued)

OTHER PUBLICATIONS

Translation of foreign document JP 10271738 A (Year: 1998).*
(Continued)

*Primary Examiner* — Alex W Mok
(74) *Attorney, Agent, or Firm* — Barnes & Thornburg LLP

(57) ABSTRACT

An electrical machine includes a rotor, which can be rotated about an axis of rotation, with which an axial direction is defined, and a stator having stator windings, a coolant distribution chamber and a coolant collecting chamber arranged axially at a distance thereto, the coolant distribution chamber fluidically communicates with the coolant collecting chamber for cooling the stator windings, a cooling duct and a stator winding are embedded in an electrically insulating plastic for thermal coupling, the stator has stator teeth which extend along the axial direction, are spaced apart from each other along a circumferential direction and bear the stator windings, the electrically insulating plastic is arranged together with the cooling duct and the stator winding in an intermediate space, and the electrically insu- (Continued)

lating plastic is formed by a first plastic mass of a first plastic material and by a second plastic mass of a second plastic material.

27 Claims, 4 Drawing Sheets

(51) Int. Cl.
*B60K 1/00* (2006.01)
*H02K 9/197* (2006.01)

(58) Field of Classification Search
CPC .. H02K 9/16; H02K 3/24; H02K 9/19; H02K 5/1732; B60K 1/00
USPC .......................................................... 310/65
See application file for complete search history.

(56) References Cited

U.S. PATENT DOCUMENTS

| | | | |
|---|---|---|---|
| 2,917,644 A * | 12/1959 | Laffoon | H02K 9/00 310/55 |
| 3,249,775 A | 5/1966 | Marcel | |
| 3,457,439 A | 7/1969 | Gering et al. | |
| 3,624,432 A | 11/1971 | Merz et al. | |
| 4,396,847 A | 8/1983 | Weghaupt et al. | |
| 5,189,325 A * | 2/1993 | Jarczynski | H02K 9/19 310/61 |
| 5,214,325 A | 5/1993 | Matson et al. | |
| 5,973,427 A | 10/1999 | Suzuki et al. | |
| 6,388,348 B2 * | 5/2002 | van Heyden | B60K 6/405 310/78 |
| 6,731,028 B2 | 5/2004 | Derleth et al. | |
| 6,778,053 B1 | 8/2004 | Irwin et al. | |
| 6,787,948 B2 * | 9/2004 | Peterson | H02K 3/24 310/58 |
| 6,789,305 B2 | 9/2004 | Seki et al. | |
| 6,810,292 B1 | 10/2004 | Rappenecker et al. | |
| 6,856,053 B2 * | 2/2005 | LeFlem | H02K 9/197 310/194 |
| 6,870,292 B2 | 3/2005 | Owada et al. | |
| 7,514,826 B2 | 4/2009 | Wakita | |
| 7,538,457 B2 * | 5/2009 | Holmes | H02K 3/24 310/57 |
| 7,589,441 B2 * | 9/2009 | Kalsi | H02K 3/47 310/180 |
| 7,683,509 B2 | 3/2010 | Neal | |
| 7,705,495 B2 | 4/2010 | Alfermann et al. | |
| 8,207,642 B2 * | 6/2012 | Lafontaine | H02K 11/048 310/90 |
| 8,400,029 B2 * | 3/2013 | Sugimoto | H02K 1/20 310/58 |
| 8,541,923 B2 | 9/2013 | Leiber et al. | |
| 8,766,497 B2 * | 7/2014 | Goto | H02K 7/006 310/71 |
| 9,300,179 B2 | 3/2016 | Sawada et al. | |
| 9,518,477 B2 | 12/2016 | Karlsson et al. | |
| 9,653,955 B2 | 5/2017 | Gundtoft et al. | |
| 9,748,822 B2 | 8/2017 | Pal | |
| 10,291,106 B2 | 5/2019 | Takahashi | |
| 10,826,345 B2 | 11/2020 | Huang et al. | |
| 2003/0098630 A1 | 5/2003 | Owada | |
| 2004/0014525 A1 | 1/2004 | Suganuma | |
| 2004/0145252 A1 | 7/2004 | Arimitsu et al. | |
| 2006/0145548 A1 | 7/2006 | Wakita | |
| 2008/0042498 A1 | 2/2008 | Beer | |
| 2008/0136271 A1 | 6/2008 | Alfermann et al. | |
| 2009/0022610 A1 | 1/2009 | Materne et al. | |
| 2009/0146513 A1 | 6/2009 | Bremner | |
| 2011/0012474 A1 | 1/2011 | Levit et al. | |
| 2011/0033321 A1 | 2/2011 | Mikkelsen et al. | |
| 2012/0091838 A1 | 4/2012 | Miyamoto et al. | |
| 2013/0062978 A1 | 3/2013 | Yamaji et al. | |
| 2013/0069455 A1 * | 3/2013 | Hamer | H02K 5/20 264/266 |
| 2014/0091651 A1 * | 4/2014 | Dorfstatter | H02K 9/00 310/58 |
| 2014/0252893 A1 | 9/2014 | Veeh et al. | |
| 2014/0292118 A1 | 10/2014 | Takahashi | |
| 2014/0300220 A1 | 10/2014 | Marvin | |
| 2014/0346778 A1 | 11/2014 | Gabeiras et al. | |
| 2015/0372565 A1 | 12/2015 | Airoldi et al. | |
| 2015/0381010 A1 * | 12/2015 | Kobes | H02K 5/20 29/598 |
| 2017/0063200 A1 | 3/2017 | Tremelling et al. | |
| 2020/0032828 A1 | 1/2020 | Baur et al. | |
| 2020/0156296 A1 | 5/2020 | Silva et al. | |
| 2020/0161916 A1 | 5/2020 | Silva et al. | |
| 2020/0161917 A1 | 5/2020 | Silva et al. | |
| 2020/0185993 A1 | 6/2020 | Hoerz et al. | |
| 2020/0204023 A1 | 6/2020 | Hoerz et al. | |
| 2020/0204024 A1 | 6/2020 | Hoerz et al. | |

FOREIGN PATENT DOCUMENTS

| | | | |
|---|---|---|---|
| CN | 1327627 C | 12/2001 | |
| CN | 1515060 A | 7/2004 | |
| CN | 101183805 A | 5/2008 | |
| CN | 101814797 A | 8/2010 | |
| CN | 102428629 A | 4/2012 | |
| CN | 102780289 A | 11/2012 | |
| CN | 102832726 A | 12/2012 | |
| CN | 102906972 A | 1/2013 | |
| CN | 103475131 A | 12/2013 | |
| CN | 203352307 U | 12/2013 | |
| CN | 103999328 A | 8/2014 | |
| CN | 104079096 A | 10/2014 | |
| CN | 105186783 A | 12/2015 | |
| CN | 106716794 A | 5/2017 | |
| DE | 69307422 T2 | 8/1997 | |
| DE | 19813160 A1 | 11/1998 | |
| DE | 19957942 C1 | 3/2001 | |
| DE | 102006029803 A1 | 1/2008 | |
| DE | 102007054364 A1 | 5/2008 | |
| DE | 102008044168 A1 | 6/2009 | |
| DE | 102012217711 A1 | 4/2014 | |
| DE | 102014221204 A1 * | 4/2016 | H02K 5/20 |
| DE | 102014017745 A1 | 6/2016 | |
| DE | 102015207865 A1 | 11/2016 | |
| DE | 112016000531 T5 | 11/2017 | |
| EP | 1300924 A2 | 4/2003 | |
| EP | 1593191 A1 | 11/2005 | |
| EP | 1780872 A2 | 5/2007 | |
| JP | S51043304 U | 3/1976 | |
| JP | 04312333 A | 11/1992 | |
| JP | 04364343 A | 12/1992 | |
| JP | 06062783 U | 9/1994 | |
| JP | 10271738 A | 10/1998 | |
| JP | 2003070199 A | 3/2003 | |
| JP | 2003164088 A | 6/2003 | |
| JP | 2003299289 A | 10/2003 | |
| JP | 2004297924 A | 10/2004 | |
| JP | 2010252491 A | 11/2010 | |
| JP | 2011120402 A | 6/2011 | |
| JP | 2014197962 A | 10/2014 | |
| WO | 2000001053 A1 | 1/2000 | |
| WO | 2004073144 A1 | 8/2004 | |
| WO | 2013054479 A1 | 4/2013 | |
| WO | 2011125145 A1 | 7/2013 | |
| WO | 2017070034 A1 | 4/2017 | |

OTHER PUBLICATIONS

Translation of foreign document DE 102014221204 A1 (Year: 2016).*
Written Opinion of the International Searching Authority of the European Patent Office in PCT/EP2018/081564 (from which this application claims priority) mailed Feb. 16, 2019 and English-language translation thereof.

(56) References Cited

OTHER PUBLICATIONS

International Search Report of the European Patent Office in PCT/EP2018/081564 (from which this application claims priority) mailed Feb. 14, 2019 and English-language translation thereof.

Search Report dated Oct. 27, 2021 issued in Chinese counterpart application No. 201880078298.4 and English language translation thereof.

Office Action dated Nov. 3, 2021 issued in Chinese counterpart application No. 201880078298.4 and English-language translation thereof.

* cited by examiner

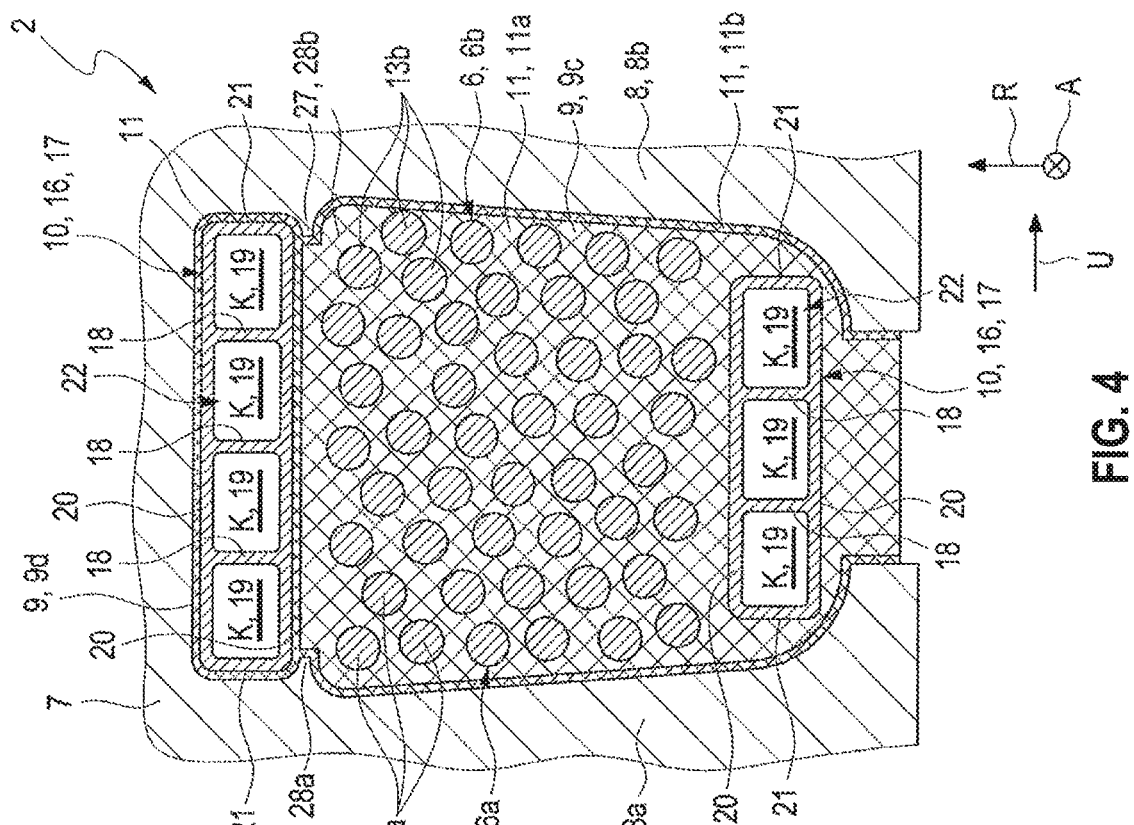
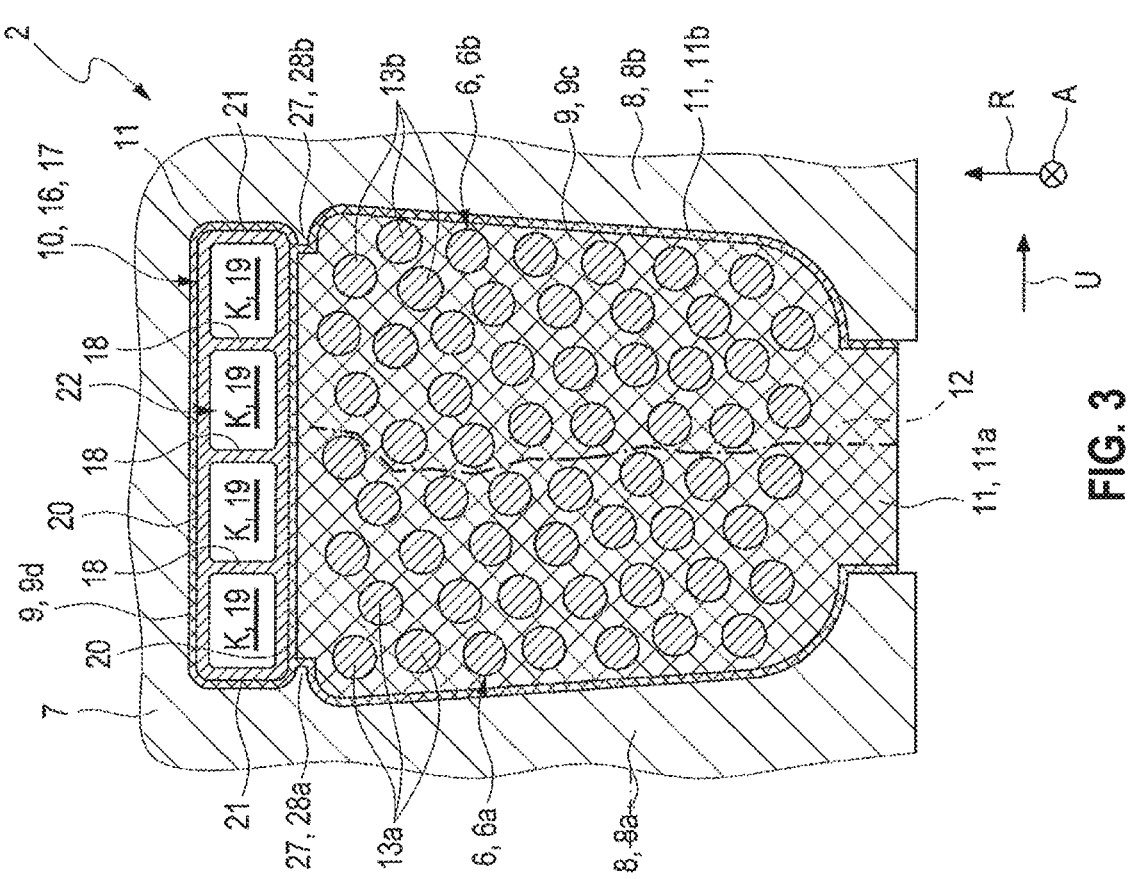

ELECTRICAL MACHINE, IN PARTICULAR FOR A VEHICLE

CROSS REFERENCE TO RELATED APPLICATIONS

This application is a continuation application of international patent application PCT/EP2018/081564, filed Nov. 16, 2018, designating the United States and claiming priority to German application DE 10 2017 221 835.5, filed Dec. 4, 2017, and the entire content of both applications is incorporated herein by reference.

TECHNICAL FIELD

The disclosure relates to an electrical machine, in particular for a vehicle, as well as a vehicle including a machine of this type.

BACKGROUND

An electrical machine of this type can generally be an electric motor or a generator. The electrical machine can be formed as external rotor or as internal rotor.

A generic machine is known, for example from U.S. Pat. No. 5,214,325. It includes a housing, which surrounds an interior and which has a jacket, which revolves in a circumferential direction of the housing and radially limits the interior, a rear side wall, which axially limits the interior axially on one side, and a front side wall, which axially limits the interior axially on the other side. A stator of the machine is firmly connected to the jacket. A rotor of the machine is arranged in the stator, wherein a rotor shaft of the rotor is rotatably supported via a front shaft bearing on the front side wall.

The stator of a conventional electrical machine typically includes stator windings, which are electrically energized during operation of the machine. Heat is thereby created, which has to be dissipated in order to avoid an overheating and damages to or even destruction of the stator associated therewith. For this purpose, it is known from conventional electrical machines to equip the latter with a cooling system for cooling the stator—in particular said stator windings. A cooling system of this type includes one or several cooling ducts, through which a coolant flows and which are arranged in the stator in the vicinity of the stator windings. Heat can be dissipated from the stator by heat transfer from the stator windings to the coolant.

It turns out to be disadvantageous thereby that an efficient heat transfer from the stator to the coolant, which flows through the respective cooling duct, is associated with significant structural effort. However, this has a disadvantageous impact on the production costs of the electrical machine.

SUMMARY

It is thus an object of the present disclosure to provide an improved electrical machine, in the case of which this disadvantage is largely or even completely eliminated. An improved electrical machine includes an improved cooling of the stator windings of the stator with simultaneously low production costs.

This object is achieved by an electrical machine, in particular for a vehicle, and a vehicle, in particular a motor vehicle, including at least one electrical machine as described herein.

It is a general idea of the disclosure to embed the stator windings of an electrical machine, together with a cooling duct through which coolant can flow, in an electrically insulating plastic, which is formed by two plastic masses made of different plastic materials, to cool the stator winding.

The plastic can thus act as heat-transferring medium to transfer heat from the stator windings to the coolant on the one hand and as electrical insulator for the stator windings on the other hand. In particular a particularly good heat transfer between the stator windings and the coolant, which is guided through the cooling duct, is established in this way. By using an electrically insulating plastic, it is simultaneously ensured that the stator windings, which are to be cooled, are not electrically short-circuited in an unwanted manner.

The use of two plastic masses made of different plastic materials allows resorting to an expensive plastic material including high thermal conductivity in areas, in which a particularly high thermal conductivity is required for the heat dissipation. In contrast, a plastic—which can typically be acquired more cost-efficiently—can be resorted to in areas, in which such a high thermal conductivity is not required. As a result, this course of action leads to significant cost advantages in the production of the electrical machine.

The direct thermal coupling of the cooling duct including the coolant to the stator windings, which are to be cooled, with the help of the embedding of these two components in the electrically insulating plastic leads to a particularly effective cooling of the stator windings. In a high load operation of the electrical machine, it can thus also be ensured that the generated waste heat can be dissipated from the stator. Damages to or even destruction of the electrical machine by overheating of the stator can thus be avoided.

The production of the electrically insulating plastic can typically take place with injection molding, in the case of which the stator windings, which are to be cooled, as well as the cooling duct, are extrusion-coated with the plastic to form the two plastic masses. The embedding of the stator windings and of the cooling duct in the plastic masses is thus very simple, even though two different plastic materials are used. Significant cost advantages also result from this in the production of the electrical machine according to the disclosure.

According to another aspect of the disclosure, the second plastic mass can act as additional electrical insulation between the stator windings and the stator body. In the event that—due to production—not all stator windings can be embedded completely in the first plastic mass, the second plastic mass prevents a possible electrical short-circuit with the electrically conductive material of the stator body in any case.

An electrical machine according to an aspect of the disclosure, in particular for a vehicle, includes a rotor, which can be rotated about an axis of rotation. The axis of rotation defines an axial direction of the electrical machine. The machine furthermore includes a stator, which has several stator windings. The machine furthermore includes a coolant distribution chamber and a coolant collecting chamber, which is arranged axially at a distance thereto. The coolant distribution chamber thereby communicates fluidically with the coolant collecting chamber with at least one cooling duct, through which a coolant can flow. Several cooling ducts of this type are typically provided between the coolant distribution chamber and the coolant collecting chamber. According to an aspect of the disclosure, the at least one cooling duct and the at least one stator winding are embedded in an electrically insulating plastic for thermal coupling to the coolant. The stator includes stator teeth, which extend along the axial direction and which are arranged spaced apart from one another along a circumferential direction and which bear the stator windings. The electrically insulating plastic is arranged together with the at least one cooling duct and with the at least one stator winding in at least one intermediate space, which is formed between two stator teeth, which are adjacent in the circumferential direction. According to an aspect of the disclosure, the electrically insulating plastic is formed by a first plastic mass made of a first plastic material and by a second plastic mass made of a second plastic material.

According to an aspect of the disclosure, the at least one stator winding has two axial end portions, on which an additional electrically insulating insulation is arranged. Even though the electrically conductive stator windings are usually already surrounded with an electrical insulation so as to prevent that electrical short-circuits are generated in response to contact of individual winding portions with one another, it cannot be ensured, however, that, after manufacture and assembly of the stator windings, all of these stator windings are equipped throughout with an insulation of this type. According to an aspect of the disclosure, it is thus ensured with a redundant, additional electrically insulating insulation that the axial end portions limit neither the coolant distribution chamber nor the coolant collecting chamber directly. An unwanted electrical short-circuit of the coolant, which is present in the coolant distribution chamber or in the coolant collecting chamber, respectively, with the electrically conductive stator windings can be prevented in this way.

According to an exemplary embodiment, the second plastic mass limits neither the coolant distribution chamber nor the coolant collecting chamber directly.

According to another exemplary embodiment, the thermal conductivity of the first plastic material is greater than the thermal conductivity of the second plastic material.

As an alternative, the thermal conductivity of the first plastic material is smaller than the thermal conductivity of the second plastic material according to another exemplary embodiment.

As an alternative, the thermal conductivity of the first plastic material is equal to the thermal conductivity of the second plastic material according to another exemplary embodiment.

In the case of a further exemplary embodiment, at least one stator winding is embedded in the first plastic mass made of the first plastic material in at least one intermediate space. The first plastic mass together with the stator winding embedded therein and the at least one cooling duct are embedded in the second plastic mass made of the second plastic material or are arranged within the second plastic mass or are at least partially or even completely surrounded by it. This measure ensures a particularly good heat transfer between the stator windings and the cooling duct. During the production of the plastic masses, said intermediate space between the stator teeth can furthermore be used in the manner of a casting mold, into which the two plastic masses are injected. This simplifies the production of the plastic masses, because the provision of a separate casting mold can be forgone.

A first and a second plastic mass are particularly typically arranged in at least two intermediate spaces, typically in all intermediate spaces. The heat transfer can be optimized in this way.

In the case of an exemplary embodiment, the at least one stator winding, typically all stator windings, including the respective two axial end portions thereof, is/are fixed to at least one stator tooth with the first plastic mass. The axial end portions can also be held on the stator body in a durably stable manner.

The thermal conductivity of thermosetting plastics as well as of thermoplastics can be set by the selection of the material composition. The thermal conductivity of a thermoplastic can thus be equal to or greater than the thermal conductivity of a thermosetting plastic and vice versa. A use of thermoplastics has various advantages as compared to the use of thermosetting plastics. For example, thermoplastics can be recycled better as a result of the reversible shaping process used in response to the processing thereof or have a lower brittleness and improved dampening properties as compared to thermosetting plastics, respectively. Due to the fact, however, that the acquisition of thermoplastics is usually more expensive than of thermosetting plastics, it is advisable to selectively use thermoplastics for cost reasons.

According to an exemplary embodiment, the first and/or the second plastic mass comprises a thermoplastic or is a thermoplastic, in order to utilize the above-mentioned advantages.

A further exemplary embodiment provides that the first and/or the second plastic mass includes a thermosetting plastic or is a thermosetting plastic, whereby the above-mentioned cost advantages can be utilized.

The first plastic material advantageously includes a thermosetting plastic or is a thermosetting plastic. In the alternative or in addition, the second plastic material can include a thermoplastic or is a thermoplastic. The use of a thermosetting plastic including thermal conductivity, which is set to be reduced in those areas, which are to be considered to be less critical with regard to heat transfer, is associated with reduced production costs.

The at least one cooling duct is typically covered or surrounded by the first or by the second plastic mass. A particularly good thermal connection of the coolant, which flows through the cooling duct, with the stator winding is ensured in this way.

According to an exemplary embodiment, the coolant distribution chamber and/or the coolant collecting chamber are at least partially arranged in the electrically insulating plastic, typically in the first plastic mass, for thermal coupling to the stator windings. This provides for a particularly good heat transfer between the coolant distribution chamber or coolant collecting chamber, respectively, and the stator windings, so that the coolant distribution chamber or the coolant collecting chamber, respectively, can also be used for direct absorption of heat from the stator windings.

The surface portions of the stator, which limit the intermediate space, are advantageously coated with the second plastic mass. This measure improves the electrical insulation of the stator windings against the stator body.

Together, the first and the second plastic mass particularly typically fill the intermediate space completely. The formation of unwanted intermediate spaces, for instance in the manner of air gaps, which would lead to an unwanted reduction of the heat transfer, is prevented in this way.

In the case of another exemplary embodiment, the first and the second plastic mass is an injection molding mass made of the first or second plastic material, respectively. The use of an injection molding process simplifies and accelerates the creation of the plastic masses. This leads to cost advantages in the production of the electrical machine.

In the case of an advantageous further development, the stator includes a, typically ring-shaped, stator body, from which the stator teeth can protrude. In the case of this further development, the first plastic mass is arranged at least on an outer circumferential side of the stator body. The stator can be insulated electrically against the external environment of the machine in this way. The provision of a separate housing for receiving the stator body can thus be forgone. A coating of at least one or of both front sides of the stator body with the first plastic mass is also conceivable in an optional variation. In a further variation, the plastic mass can cover the stator body, typically completely. Particularly typically, the first plastic mass forms an outer coating on the outer circumferential side. The stator body is electrically insulated on the outer circumferential side in this way. The provision of a separate housing for receiving the stator body can thus be forgone. A coating of at least one or of both front sides of the stator body with the first plastic mass is also conceivable in an optional variation. In a further variation, the plastic mass can cover the stator body, typically completely.

According to a further aspect of the disclosure, the intermediate space is divided into a first and a second partial space. In the case of this design, the at least one stator winding is arranged in the first partial space. The at least one cooling duct is arranged in the second partial space. A positioning aid, with which the at least one cooling duct can be positioned in the second partial space, is formed between the two partial spaces. This measure allows for a precise and stable positioning of the cooling duct, which is typically a tube body or a flat tube, respectively, when said cooling duct, together with the stator windings, is extrusion-coated with the plastic, which results in the two plastic masses, in the intermediate space between the two stator teeth.

According to a further aspect of the disclosure, the positioning aid includes two protrusions, which are formed on two stator teeth, which are adjacent in the circumferential direction. The two protrusions face one another in the circumferential direction of the rotor and protrude into the intermediate space so as to position in the cooling duct. This design allows for a particularly exact alignment of the cooling duct in the intermediate space prior to the extrusion-coating with the plastic of the plastic mass.

The first plastic mass advantageously protrudes axially from the respective intermediate space, typically on both sides. The first plastic mass can thus also be used for partially limiting the coolant distribution chamber or the coolant collecting chamber. A removal of the part of the first plastic mass, which protrudes from the intermediate space, which is required as part of the production of the machine, can in particular be forgone, which is associated with cost advantages in the production of the machine.

According to a further aspect of the disclosure, the first plastic mass at least partially limits the coolant distribution chamber and/or the coolant collecting chamber. The provision of a separate limitation for the coolant distribution chamber or the coolant collecting chamber, for instance in the form of a housing, can thus be forgone.

At least one cooling duct as well as the first and second plastic mass can advantageously be provided in at least one, typically in each intermediate space, between two stator teeth, which are each adjacent in the circumferential direction. It is ensured in this way that waste heat, which is operatively generated, can be dissipated from all available stator windings.

According to another exemplary embodiment, the at least one cooling duct is arranged radially outside or radially within the respective stator winding in the intermediate space. This provides an installation space-efficient arrangement of the cooling duct close to the stator windings, which are to be cooled, such that the electrical machine requires only little installation space for cooling the stator windings.

In the alternative, at least one cooling duct can also be arranged radially outside and at least one further cooling duct can additionally be arranged radially within the respective stator winding in the intermediate space. In the case of this variation, at least two cooling ducts are thus provided for cooling the stator winding, whereby an increased cooling capacity is achieved.

According to a further aspect of the disclosure, the at least one cooling duct is formed as a tube body, which surrounds a tube body interior. In the case of this variation, at least one separating element, which divides the tube body interior into at least two partial cooling ducts, which are fluidically separated from one another, is integrally molded on the tube body. The tube body can be reinforced with said separating elements, so that the mechanical strength thereof increases. The tube body can be formed by an electrically conductive material, in particular a metal or by an electrically insulating material, in particular a plastic.

According to a further aspect of the disclosure, the tube body is formed as a flat tube, which extends along the axial direction and has two broad sides and two narrow sides in a cross-section perpendicular to the axial direction. At least one broad side of the flat tube advantageously extends substantially perpendicular to the radial direction in the cross-section perpendicular to the axial direction. A length of the two broad sides can thereby typically be at least four times, typically at least ten times, a length of the two narrow sides.

According to a further exemplary embodiment, the coolant distribution chamber and/or the coolant collecting chamber are formed by a cavity, which is present at least partially, typically completely, in the first plastic mass. The provision of a separate casing or of a housing, respectively, for limiting the coolant distributor or coolant collecting chamber, respectively, can thus be forgone. This is associated with significant cost advantages.

According to an exemplary embodiment, the electrically insulating insulation is formed at least partially, typically completely, by an insulating varnish. An insulating varnish of this type can be applied to the stator windings with spraying as part of the production of the stator. In the alternative, it is also conceivable, however, to realize the additional insulation with the electrically insulating plastic, typically with a third plastic mass, which is part of the electrically insulating plastic. This variation can be produced particularly easily and is thus cost-efficient.

The disclosure further relates to a vehicle, in particular a motor vehicle, including an above-introduced electrical machine. The above-described advantages of the electrical machine can thus also be transferred to the vehicle according to an aspect of the disclosure.

Further important features and advantages of the disclosure follow from the claims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present disclosure.

BRIEF DESCRIPTION OF THE DRAWINGS

The disclosure will now be described with reference to the drawings wherein:

FIG. 3 shows a detailed illustration of the stator shown in FIG. 2 in the area of an intermediate space between two stator teeth, which are adjacent in the circumferential direction, FIG. 4 shows a further development of the variation shown in FIG. 3.

DESCRIPTION OF EXEMPLARY EMBODIMENTS

Figure 1:
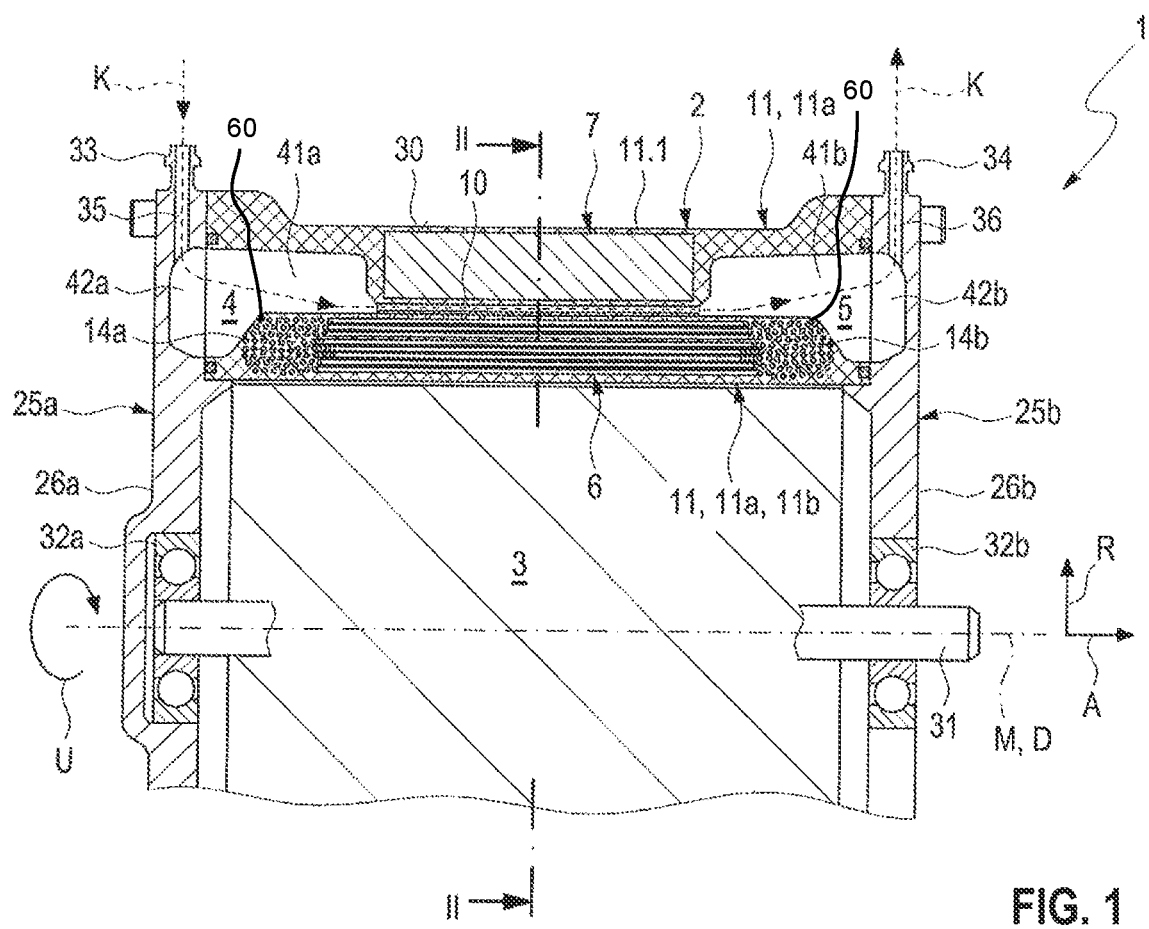
FIG. 1 shows an electrical machine in a longitudinal section along the axis of rotation of the rotor according to an exemplary embodiment of the disclosure.

FIG. 1 illustrates an electrical machine 1 according to an exemplary embodiment of the disclosure in a sectional illustration. The electrical machine 1 is dimensioned such that it can be used in a vehicle, typically in a road vehicle.

Figure 2:
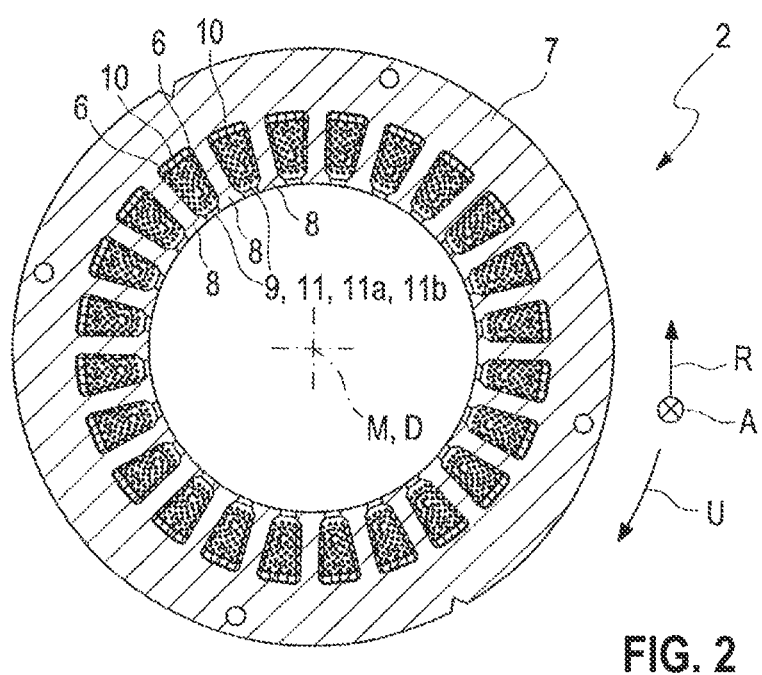
FIG. 2 shows the stator of the electrical machine shown in FIG. 1 in a cross-section perpendicular to the axis of rotation of the rotor.

The electrical machine 1 includes a rotor 3, which is only illustrated roughly schematically in FIG. 1, and a stator 2. For reasons of clarity, the stator 2 is illustrated in FIG. 2 in a cross-section perpendicular to the axis of rotation D along the sectional line II-II of FIG. 1 in a separate illustration. According to FIG. 1, the rotor 3 has a rotor shaft 31 and can have several magnets, which are not illustrated in more detail in FIG. 1 and the magnetic polarization of which alternates along the circumferential direction U. The rotor 3 can be rotated about an axis of rotation D, the position of which is defined by the central longitudinal axis M of the rotor shaft 31. An axial direction A, which extends parallel to the axis of rotation D, is defined by the axis of rotation D. A radial direction R is perpendicular to the axial direction A. A circumferential direction U rotates around the axis of rotation D.

As can be seen in FIG. 1, the rotor 3 is arranged in the stator 2. The electrical machine 1 shown here is thus a so-called internal rotor. A realization as so-called external rotor, in the case of which the rotor 3 is arranged outside of the stator 2, is also conceivable. The rotor shaft 31 is supported on the stator 2 in a first shaft bearing 32a and, axially spaced apart therefrom, in a second shaft bearing 32b, so as to be rotatable around the axis of rotation D.

In a known manner, the stator 2 furthermore includes several stator windings 6, which can be electrically energized, to generate a magnetic field. Due to magnetic interaction of the magnetic field, which is generated by the magnets of the rotor 3, the rotor 3 is set in rotation with the magnetic field generated by the stator windings 6.

It can be gathered from the cross section of FIG. 2 that the stator 2 can have a ring-shaped stator body 7, for example made of iron. The stator body 7 can in particular be formed of several stator body plates (not shown), which are stacked on top of one another along the axial direction A and which are adhered to one another. Several stator teeth 8, which extend along the axial direction A, protrude radially to the inside away from the stator body 7, and are arranged spaced apart from one another along the circumferential direction U, are integrally molded to the stator body 7 radially on the inside. Each stator tooth 8 bears a stator winding 6. Together, the individual stator windings 6 form a winding arrangement. Depending on the number of the magnetic poles, which are to be formed by the stator windings 6, the individual stator windings 6 of the entire winding arrangement can be wired together electrically in a suitable manner.

During operation of the machine 1, the electrically energized stator windings 6 generate waste heat, which has to be dissipated from the machine 1, in order to prevent an overheating and damages to or even destruction of the machine 1 associated therewith. The stator windings 6 are thus cooled with the help of a coolant K, which is guided through the stator 2, and which absorbs the waste heat generated by the stator windings 6 with heat transfer.

To guide the coolant K through the stator 2, the machine 1 includes a coolant distribution chamber 4, into which a coolant K can be introduced via a coolant inlet 33. A coolant collecting chamber 5 is arranged along the axial direction A at a distance from the coolant distribution chamber 4. The coolant distribution chamber 4 communicates fluidically with the coolant collecting chamber 5 with several cooling ducts 10, of which only a single one can be seen in the illustration of FIG. 1. The coolant distribution chamber 4 and the coolant collecting chamber 5 can each have a ring-shaped geometry in a cross-section perpendicular to the axial direction A, which is not shown in the figures. Several cooling ducts 10, which each extend along the axial direction A from the ring-shaped coolant distribution chamber 4 to the ring-shaped coolant collecting chamber 5, are arranged along the circumferential direction U at a distance from one another. The coolant K, which is introduced into the coolant distribution chamber 4 via the coolant inlet 33, can thus be distributed to the individual cooling ducts 10. After flowing through the cooling ducts 10 and the absorption of heat from the stator windings, the coolant K is collected in the coolant collecting chamber 5 and is dissipated from the machine 1 again via a coolant outlet 34 provided on the stator 2.

As can be seen in the illustrations of FIGS. 1 and 2, the stator windings 6 are arranged in intermediate spaces 9, which are formed between two stator teeth 8, which are each adjacent in the circumferential direction U. Said intermediate spaces 9 are also known to the pertinent person of skill in the art as so-called "stator grooves" or "stator slots", which extend along the axial direction A, as do the stator teeth 8.

Attention is to now be directed to the illustration of FIG. 3, which shows an intermediate space 9 formed between two stator teeth 8—hereinafter also referred to as stator teeth 8a, 8b-which are adjacent in the circumferential direction U, in a detailed illustration. To improve the heat transfer of the waste heat generated by the stator windings 6 to the coolant K flowing through the cooling ducts 10, an electrically insulating plastic 11 is in each case provided according to FIG. 3 in the intermediate spaces 9. The electrically insulating plastic 11 is formed by a first plastic mass 11a made of a first plastic material and by a second plastic mass 11b made of a second plastic material, the thermal conductivity of which is greater than the thermal conductivity of the first plastic material. The first plastic material 11a is a thermosetting plastic. The second plastic material 11b is a thermoplastic. In the example scenario, a first and a second plastic mass 11a and 11b are in each case arranged in all intermediate spaces 9. In variations of the example, it is conceivable to select the plastic materials of the two plastic masses 11a and 11b in such a way that thermal conductivity of the second plastic material is smaller than the thermal conductivity of the first plastic material. In a further variation, two plastic materials including identical heat conductivity can also be used for the first and second plastic mass 11a and 11b.

As shown in FIG. 3, the stator windings 6 arranged in the intermediate space 9 and a cooling duct 10 are embedded in the first plastic mass 11a made of the first plastic material. The first plastic mass 11a together with the stator winding 6 embedded therein and including the cooling duct 10, in turn, are embedded in the second plastic mass 11b made of the second plastic material or are partially surrounded by it, respectively. As can be seen in FIG. 3, the cooling duct 10 is covered completely by the second plastic mass 11b in the cross-section perpendicular to the axial direction A.

The two plastic masses 11a and 11b are typically each injection molding masses made of the electrically insulating plastic. The use of an injection molding process simplifies and accelerates the production of the plastic mass.

It goes without saying that the stator winding 6, which is arranged in the intermediate space 9 according to FIG. 3, in each case partially belongs to a first stator winding 6a, which is borne by a first stator tooth 8a, and is partially assigned to a second stator winding 6b, which is borne by a second stator tooth 8b, which is adjacent to the first stator tooth 8a in the circumferential direction U. To clarify this scenario, a virtual separating line 12 is delineated in FIG. 3. The winding wires 13a shown to the left of the separating line 12 in FIG. 3 belong to the stator winding 6a, which is borne by the stator tooth 8a. The winding wires 13b shown to the right of the separating line 12 belong to the stator winding 6b, which is borne by the stator tooth 8b.

As shown in FIG. 1, the stator windings 6 each have two axial end portions 14a and 14b, on which an additional electrically insulating insulation 60 is arranged. Even though the electrically conductive stator windings are usually already surrounded with an electrical insulation so as to prevent that electrical short-circuits are generated in response to contact of individual winding portions within another, it cannot be ensured that, after manufacture and assembly of the stator windings 6, all of these stator windings 6 are equipped throughout with an insulation of this type. It is thus ensured with a redundant, additional electrically insulating insulation that the axial end portions 14a and 14b neither limit the coolant distribution chamber 4 nor the coolant collecting chamber 5 directly. An unwanted electrical short-circuit of the coolant, which is present in the coolant distribution chamber 4 or in the coolant collecting chamber 5, respectively, with the electrically conductive stator windings can be prevented in this way.

The additional electrically insulating insulation 60 can be formed by an insulating varnish. An insulating varnish of this type can be applied to the stator windings 6 with spraying as part of the production of the stator 2. In the alternative, it is also conceivable, however, to realize the additional electrically insulating insulation 60 with the electrically insulating plastic 11, for example with a further, third plastic mass, which is part of the electrically insulating plastic 11.

The stator windings 6, including their respective two axial end portions 14a and 14b, are fixed to the stator teeth 8 with the first plastic mass 11a. The axial end portions 14a and 14b can also be held on the stator body 7 in a durably stable manner in this way.

As substantiated by the detailed illustration of FIG. 3, the cooling ducts 10 can each be formed by a tube body 16, for example made of aluminum, which surrounds a tube body interior 22. An electrically conductive material, in particular a metal or an electrically insulating material, in particular a plastic, can generally be considered as material for the tube body 16 or for the cooling duct 10, respectively. As shown in the detailed illustration of FIG. 3, one or several separating elements 18, which separate the cooling duct 10 into partial cooling ducts 19, which are fluidically separated from one another, can optionally be integrally molded on the tube body 16, as shown in FIG. 3. The flow behavior of the coolant K in the cooling duct 10 can be improved in this way, which is associated with an improved heat transfer to the coolant K. In addition, the tube body 16 is additionally mechanically reinforced in this way. Three separating elements 18 of this type are illustrated in an exemplary manner in FIG. 3, thus resulting in four partial cooling ducts 19. It goes without saying that a different number of separating elements 18 is possible in variations of the exemplary embodiment. The tube body 16, which forms the cooling duct 10, is formed as flat tube 17, which has two broad sides 20 and two narrow sides 21 in a cross-section perpendicular to the axis of rotation D of the rotor 3 (see FIG. 3). In the cross-section perpendicular to the axial direction A shown in FIG. 3, the two broad sides 20 of the flat tube 17 extend perpendicular to the radial direction R. A length of the two broad sides 20 is at least four times, typically at least ten times, a length of the two narrow sides 21.

In the example of FIGS. 1 to 3, the cooling duct 10 is arranged radially outside the stator windings 6 in the respective intermediate space 9. The radial distance of the cooling ducts 10 to the axis of rotation D of the rotor 3 is thus greater than the radial distance of the stator windings 6 to the axis of rotation D. However, an arrangement of the cooling duct 10 radially on the inside is also conceivable.

To produce an electrical machine 1 according to FIGS. 1 to 3, the cooling ducts 10 formed by tube bodies 16 or flat tubes 17, respectively, are initially introduced into the intermediate spaces 9. The surfaces of the stator body 7 limiting the intermediate spaces 9 are subsequently extrusion-coated with the second plastic material, typically a thermoplastic, and the second plastic mass 11b is formed in this way. The material of the stator body 7 is electrically insulated towards the respective intermediate space 9 in this way. The stator windings 6 are then introduced into the intermediate spaces 9 and are arranged on the stator teeth 8. The stator windings 6 are then extrusion-coated with the first plastic material, typically a thermosetting plastic, which results in the first plastic mass 11a. The stator 7 can also be extrusion-coated with the first plastic material forming the first plastic mass 11a as part of the production of the electrically insulating plastic 11, which consists of the two plastic masses 11a and 11b.

According to FIG. 3, the intermediate space 9 can include a first partial space 9c, in which the stator winding 6 is arranged, and a second partial space 9d, in which the cooling duct 10 is arranged and which supplements the first partial space 9c to form the intermediate space 9. As can be seen in FIGS. 3 and 4, a positioning aid 27, with which the cooling duct 10 is fixed in the second partial space 9d, can be arranged between the two partial spaces 9c and 9d. Said positioning aid 27 includes two protrusions 28a and 28b, which are formed on the two stator teeth 8a and 8b, which are adjacent in the circumferential direction U and limit the intermediate space 9. The two protrusions 28a and 28b face one another in the circumferential direction U and protrude into the intermediate space 9 in order to position the cooling duct 10. The protrusions 28a and 28b thereby act as radial stop for the cooling duct 10, which is formed as tube body 16 or flat tube body 17, respectively, which can prevent an unwanted movement of the cooling duct 10 radially to the inside, in particular in response to the production of the plastic masses 11a and 11b with injection molding.

FIG. 4 shows a further development of the example of FIG. 3. The further development of FIG. 4 differs from the exemplary embodiment shown in FIG. 3 in that a cooling duct 10, which, as in the example of FIG. 3, can be formed as tube body 16 or as flat tube 17, respectively, is provided not only radially on the outside, but additionally also radially on the inside in the intermediate space 9. As an example, the radially inner cooling duct 10 is illustrated as flat tube 17 including two separating elements 18 and three partial cooling ducts 19. Where sensible, the above descriptions with regard to the example of FIG. 3 also apply mutatis mutandis for the example of FIG. 4.

Reference will be made below to FIG. 1 again. As clearly shown in FIG. 1, the first plastic mass 11a, which is typically formed in one piece, can protrude axially from the intermediate spaces 9 on both sides. This also allows for the embedding of the coolant distribution chamber 4, and, alternatively or additionally, the coolant collecting chamber 5 in the plastic mass 11, for thermal coupling to the two axial end portions 14a and 14b of the respective stator winding 6, which are arranged axially outside of the respective intermediate space 9. In the area of the axial end portions 14a and 14b of the respective stator winding 6, which are usually specially loaded thermally, an effective heat transfer to the coolant K, which is present in the coolant distribution chamber 4 or coolant collecting chamber 5, respectively, can also be established in this way. This measure allows for a particularly effective cooling of the two axial end portions 14a and 14b of the stator winding 6.

As shown in FIG. 1, the stator 2 together with the stator body 7 and the stator teeth 8 is further arranged axially between a first and a second bearing shield 25a and 25b.

As can be seen in FIG. 1, a part of the coolant distribution chamber 4 is arranged in the first bearing shield 25a, and a part of the coolant collecting chamber 5 is arranged in the second bearing shield 25b. The coolant distribution chamber 4 and the coolant collecting chamber 5 are thus each partially formed by a cavity 41a and 41b, which is provided in the first plastic mass 11a.

The first cavity 41a is thereby supplemented by a cavity 42a formed in the first bearing shield 25a to form the coolant distribution chamber 4. The second cavity 41b is accordingly supplemented by a cavity 42b formed in the second bearing shield 25b to form the coolant distributing chamber 5. In the case of the above-described embodiment variation, the plastic mass 11a—but not the second plastic mass 11b—thus limits the coolant distribution chamber 4 as well as the coolant collecting chamber 5 at least partially.

A coolant supply 35, which fluidically connects the coolant distribution chamber 4 to a coolant inlet 33, which is provided on the first bearing shield 25a on the outside, in particular circumferentially as illustrated in FIG. 1, can further be formed in the first bearing shield 25a. A coolant discharge 36, which fluidically connects the coolant collecting chamber 5 to a coolant outlet 34, which is provided on the bearing shield 25b on the outside, in particular circumferentially, as illustrated in FIG. 1, can accordingly be provided in the second bearing shield 25b. This provides for an arrangement of the coolant distribution chamber 4 or of the coolant collecting chamber 5, respectively, in each case radially on the outside of the first or second end portion 14a and 14b, respectively, of the respective stator winding 6 and also in the extension of these end portions 14a and 14b along the axial direction A. The end portions 14a and 14b of the stator windings 6, which are specially loaded thermally during operation of the machine 1, are also cooled particularly effectively with this measure.

As shown in FIG. 1, the first plastic mass 11a made of the electrically insulating plastic 11 can also be arranged on an outer circumferential side 30 of the stator body 7 and can thus form a plastic coating 11.1 on the outer circumferential side 30. The stator body 7 of the stator 2, which is typically formed of electrically conductive stator plates, can thus be electrically insulated against the surrounding area. The provision of a separate housing for receiving the stator body 7 can thus be forgone.

Figure 5:
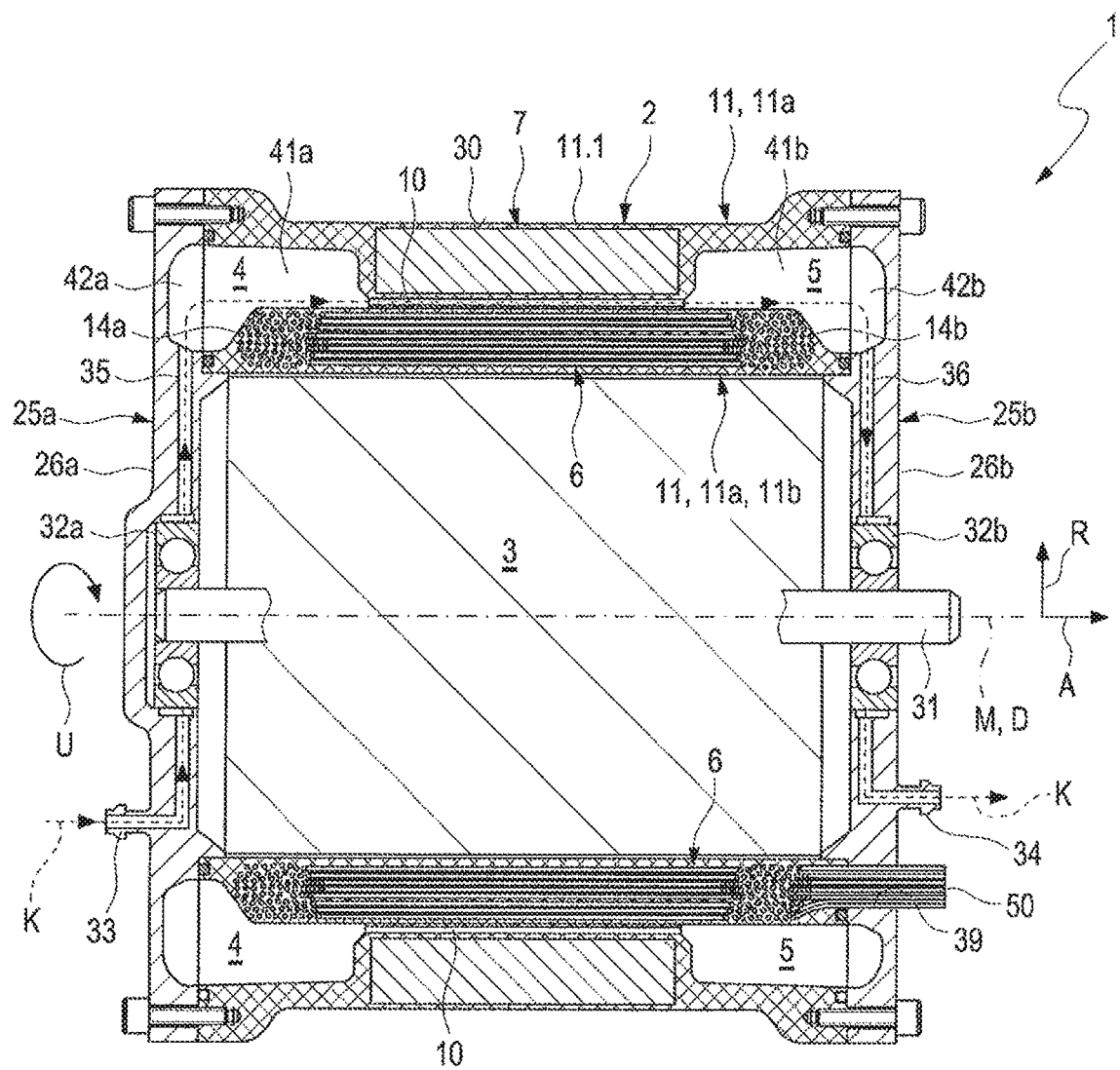
FIG. 5 shows a first variation of the electrical machine shown in FIG. 1, in the case of which the coolant, which flows through the cooling ducts, is also used to cool the shaft bearings of the rotor.

FIG. 5 shows a variation of the example of FIG. 1. To also cool the rotor shaft 31 as well as the two shaft bearings 32a and 32b during operation of the machine 1, the coolant supply 35 can be thermally coupled to the first shaft bearing 32a, which is arranged in the first bearing shield 25a. The coolant discharge 36 can likewise be thermally coupled to the second shaft bearing 32b, which is arranged in the second bearing shield 25b. A separate cooling device for cooling the shaft bearings 32a and 32b can be forgone in this way, which results in significant cost advantages. In the example of FIG. 5, the coolant inlet 33 and the coolant outlet 34 are provided on the outer front side 26a and 26b of the respective bearing shield 25a and 25b. However, a circumferential or radial arrangement, respectively, is also conceivable. In the case of the variation according to FIGS. 5 and 1, the stator windings 6 are arranged radially within the cooling ducts 10 with respect to the radial direction R.

The stator windings 6 are guided out of the stator 2 to the outside with an electrical connection 50 through a lead-through 39 provided in the second bearing shield 25b, so that they can be electrically energized from the outside. The lead-through 39 is arranged radially between the coolant distribution chamber 4 or the coolant collecting chamber 5, respectively, and the axis of rotation D.

Figure 6:
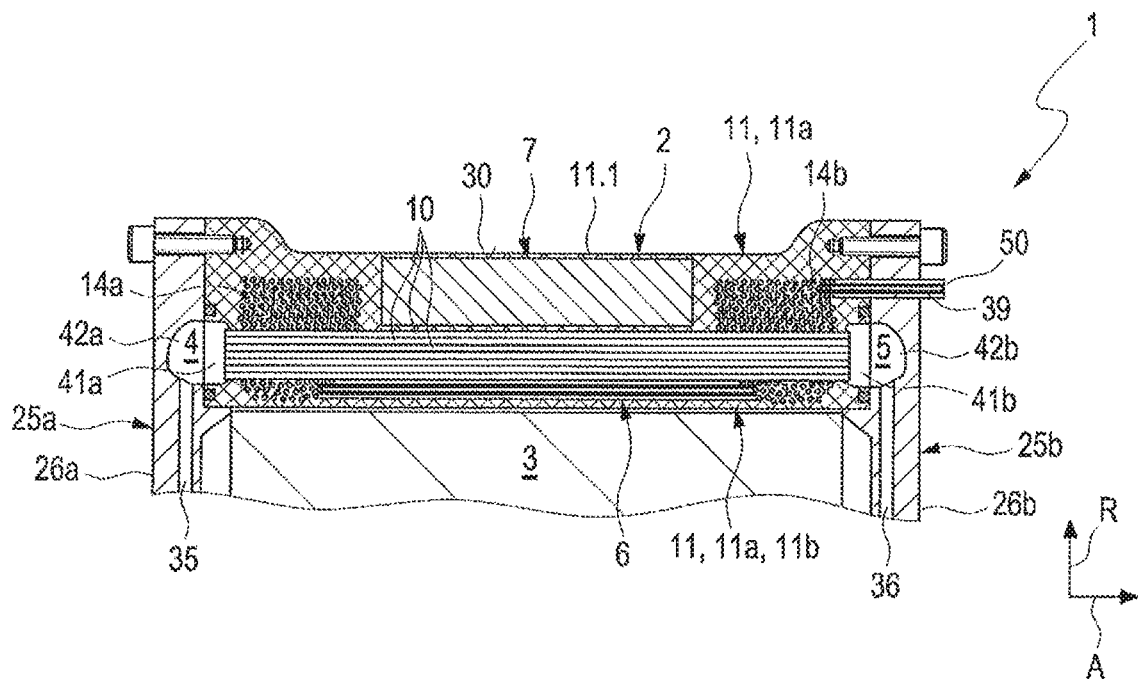
FIG. 6 shows a second variation of the electrical machine according to FIG. 1, which requires particularly little installation space.

In the example of FIG. 6, which shows an exemplary embodiment, which is simplified as compared to FIG. 5, the coolant distribution chamber 4 and the coolant collecting chamber 5 are arranged only in the axial extension of the cooling ducts 10. This variation requires particularly little installation space for the coolant distribution chamber 4 and for the coolant collecting chamber 5.

In the case of the variation according to FIG. 6, the stator windings 6 are arranged radially within the cooling ducts 10 with respect to the radial direction R. The stator windings 6 are guided out of the stator 2 to the outside with an electrical connection 50 through a lead-through 39 provided in the second bearing shield 25b, so that they can be electrically energized from the outside. The lead-through 39 is arranged in the second bearing shield 25b radially outside of the coolant distribution chamber 4 or of the coolant collecting chamber 5, respectively, with respect to the radial direction R.

Figure 7:
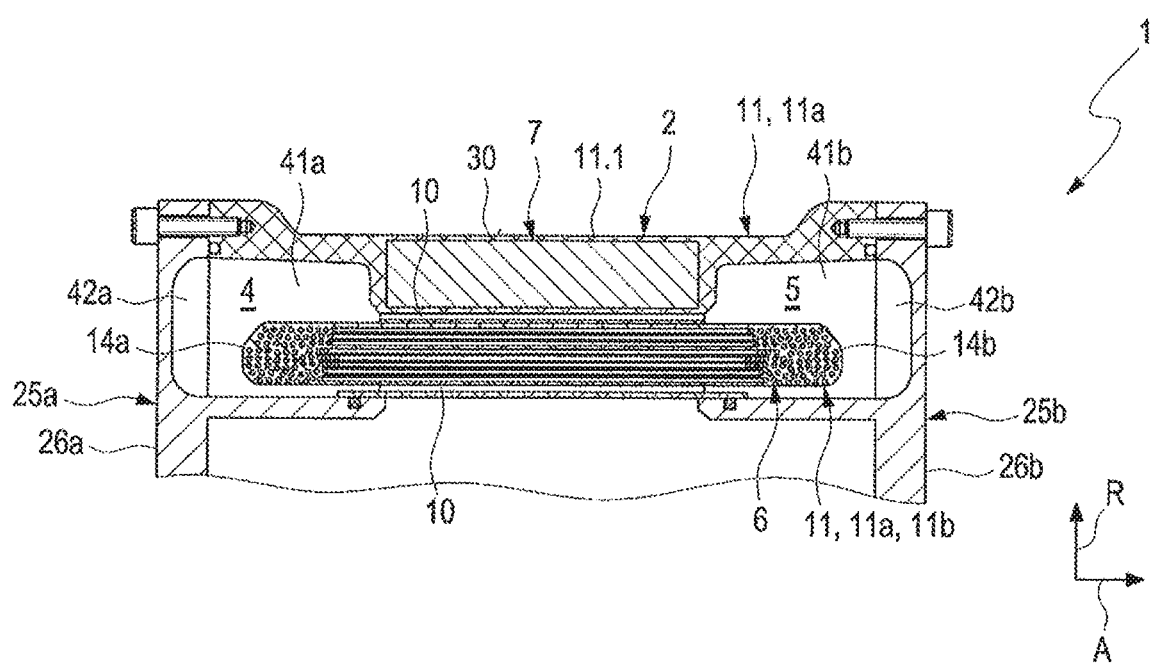
FIG. 7 shows a third variation of the machine shown in FIG. 1, which provides for a particularly effective cooling of the stator windings.

In the example of FIG. 7, a further development of FIG. 5 is shown. In the longitudinal section along the axis of rotation D illustrated in FIG. 7, the coolant distribution chamber 4 surrounds the first axial end portion 14a of the respective stator winding 6 in a U-shaped manner, thus axially on the end side as well as radially on the inside and radially on the outside in the case of this further development. The coolant collecting chamber 5 accordingly surrounds the second axial end portion 14b of the respective stator winding 6 in a U-shaped manner, thus axially on the end side as well as radially on the inside and radially on the outside in the longitudinal section along the axis of rotation D. In the case of this variation, cooling ducts 10 are provided radially within as well as radially outside of the stator winding 6. The respective stator windings 6, including the axial end portions 14a and 14b thereof, are thus in direct thermal contact with the coolant K via the cooling ducts 10 as well as via the coolant distribution chamber 4 as well as the coolant collecting chamber 5. This allows for a particularly effective cooling of the stator winding 6, including the axial end portions 14a and 14b, which are subjected to thermally special loads.

It is understood that the foregoing description is that of the exemplary embodiments of the disclosure and that various changes and modifications may be made thereto without departing from the spirit and scope of the disclosure as defined in the appended claims.

What is claimed is:

1. An electrical machine for a vehicle, the electrical machine comprising:
   a rotor, which can be rotated about an axis of rotation, which defines an axial direction of the electrical machine;
   a stator, which has several stator windings; a coolant distribution chamber; and
   a coolant collecting chamber, which is arranged axially at a distance thereto,
   wherein the coolant distribution chamber communicates fluidically with the coolant collecting chamber with at least one cooling duct, through which a coolant can flow to cool the stator windings,
   wherein the electrical machine is configured such that the coolant cannot get in contact with the rotor,
   wherein the at least one cooling duct and at least one stator winding are embedded in an electrically insulating plastic for thermal coupling,
   wherein the at least one cooling duct is arranged radially on an outer side of the at least one stator winding in a direction facing away from the rotor and at least one further cooling duct is arranged radially on an inner side of the at least one stator winding in a direction facing towards the rotor in an intermediate space,
   wherein the stator has stator teeth, which extend along the axial direction and which are arranged spaced apart from one another along a circumferential direction and which bear the stator windings,
   wherein the electrically insulating plastic is arranged together with the at least one cooling duct and with the at least one stator winding in at least one intermediate space, which is formed between two stator teeth, which are adjacent in the circumferential direction,
   wherein the electrically insulating plastic is formed by a first polymer having a first mass and a second polymer having a second mass, wherein the second mass is different than the first mass, and
   wherein the at least one stator winding has two axial end portions, on which an additional electrically insulating insulation is arranged, so that the axial end portions each limit neither the coolant distribution chamber nor the coolant collecting chamber directly.

2. The electrical machine according to claim 1, wherein the second plastic mass limits neither the coolant distribution chamber nor the coolant collecting chamber directly.

3. The electrical machine according to claim 1, wherein the thermal conductivity of the first plastic material is greater than the thermal conductivity of the second plastic material.

4. The electrical machine according to claim 1, wherein the thermal conductivity of the first plastic material is smaller than the thermal conductivity of the second plastic material.

5. The electrical machine according to claim 1, wherein the thermal conductivity of the first plastic material is equal to the thermal conductivity of the second plastic material.

6. The electrical machine according to claim 1, wherein:
   at least one stator winding is embedded in the first plastic mass made of the first plastic material in the at least one intermediate space, and
   the first plastic mass together with the stator winding embedded therein and the at least one cooling duct are at least partially surrounded by the second plastic mass made of the second plastic material, or embedded therein.

7. The electrical machine according to claim 1, wherein the at least one stator winding, or all stator windings, including the respective two axial end portions thereof, is/are fixed to at least one stator tooth with the first plastic mass.

8. The electrical machine according to claim 1, wherein the first and/or the second plastic material of the first and/or second plastic mass comprise a thermosetting plastic or is a thermosetting plastic.

9. The electrical machine according to claim 1, wherein the first and/or the second plastic material of the first and/or second plastic mass comprise a thermoplastic or is a thermoplastic.

10. The electrical machine according to claim 1, wherein:
    the first plastic material comprises a thermosetting plastic or is a thermosetting plastic, and/or
    the second plastic material comprises a thermoplastic or is a thermoplastic.

11. The electrical machine according to claim 1, wherein the at least one cooling duct is covered or surrounded by the electrically insulating plastic, or by the first or by the second plastic mass.

12. The electrical machine according to claim 1, wherein the coolant distribution chamber and/or the coolant collecting chamber are at least partially arranged in the electrically insulating plastic, or in the first plastic mass, for thermal coupling to the stator windings.

13. The electrical machine according to claim 1, wherein the surface portions of the stator, which limit the intermediate space, are at least partially coated with the second plastic mass.

14. The electrical machine according to claim 1, wherein together, the first and the second plastic mass fill the intermediate space substantially completely.

15. The electrical machine according to claim 1, wherein the first and the second plastic mass are formed by an injection molding mass made of the first or second plastic material, respectively.

16. The electrical machine according to claim 1, wherein:
    the stator comprises a ring-shaped stator body, and
    the first plastic mass is arranged at least on an outer circumferential side of the stator body.

17. The electrical machine according to claim 1, wherein the first plastic mass forms an outer coating on the outer circumferential side.

18. The electrical machine according to claim 1, wherein the intermediate space comprises a first partial space, in which the at least one stator winding is arranged, and a second partial space, in which the at least one cooling duct is arranged, a positioning aid, with which the at least one cooling duct can be positioned in the second partial space, is arranged between the two partial spaces.

19. The electrical machine according to claim 18, wherein:
the positioning aid comprises two protrusions, which are formed on two stator teeth, and which are adjacent in the circumferential direction, and
the two protrusions face one another in the circumferential direction and protrude into the intermediate space to position the cooling duct.

20. The electrical machine according to claim 1, wherein at least the first plastic mass protrudes axially from the intermediate space.

21. The electrical machine according to claim 1, wherein the first plastic mass at least partially limits the coolant distribution chamber and/or the coolant collecting chamber.

22. The electrical machine according to claim 1, wherein at least one cooling duct and the electrically insulating plastic are provided in at least one, or in each intermediate space between two stator teeth, which are each adjacent in the circumferential direction.

23. The electrical machine according to claim 1, wherein the at least one cooling duct is arranged radially outside or radially within the respective stator winding in the intermediate space, or that at least one cooling duct is arranged radially outside and at least one further cooling duct is arranged radially within the respective stator winding in the intermediate space.

24. The electrical machine according to claim 1, wherein:
the at least one cooling duct is formed as a tube body, which surrounds a tube body interior, and
at least one separating element, which divides the tube body interior into at least two partial cooling ducts, which are fluidically separated from one another, is integrally molded on the tube body.

25. The electrical machine according to claim 24, wherein:
the tube body is formed as flat tube, and
at least one broad side of the flat tube extends substantially perpendicular to the radial direction in a cross-section perpendicular to the axial direction.

26. The electrical machine according to claim 1, wherein the additional electrically insulating insulation is formed at least partially, or completely, by an insulating varnish and/or by a third plastic mass, which is part of the electrically insulating plastic.

27. The vehicle, comprising at least one electrical machine according to claim 1.

* * * * *